US008281379B2

(12) United States Patent
Noë

(10) Patent No.: US 8,281,379 B2
(45) Date of Patent: Oct. 2, 2012

(54) METHOD AND SYSTEM FOR PROVIDING A FEDERATED AUTHENTICATION SERVICE WITH GRADUAL EXPIRATION OF CREDENTIALS

(75) Inventor: Frederik Noë, Roeselare (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 919 days.

(21) Appl. No.: 12/270,486

(22) Filed: Nov. 13, 2008

(65) Prior Publication Data

US 2010/0122333 A1    May 13, 2010

(51) Int. Cl.
*H04L 29/06*       (2006.01)
*H04L 9/32*        (2006.01)
(52) U.S. Cl. .................................. 726/8; 726/6; 726/10
(58) Field of Classification Search ........................ None
See application file for complete search history.

(56) References Cited

U.S. PATENT DOCUMENTS

| | | | | |
|---|---|---|---|---|
| 5,944,824 A * | 8/1999 | He | ................................... | 726/6 |
| 6,304,974 B1 * | 10/2001 | Samar | ............................. | 726/10 |
| 6,668,322 B1 * | 12/2003 | Wood et al. | .................... | 713/182 |
| 6,691,232 B1 * | 2/2004 | Wood et al. | ........................ | 726/6 |
| 6,892,307 B1 * | 5/2005 | Wood et al. | ........................ | 726/8 |
| 6,944,761 B2 * | 9/2005 | Wood et al. | .................... | 713/155 |
| 7,194,547 B2 | 3/2007 | Moreh et al. | | |
| 7,392,536 B2 * | 6/2008 | Jamieson et al. | ................. | 726/8 |
| 7,788,700 B1 * | 8/2010 | Feezel et al. | ........................ | 726/2 |
| 7,818,576 B2 * | 10/2010 | Halcrow et al. | ............... | 713/175 |
| 2002/0184507 A1 | 12/2002 | Makower et al. | | |
| 2004/0093493 A1 * | 5/2004 | Bisbee et al. | ................. | 713/156 |
| 2004/0158723 A1 * | 8/2004 | Root | ............................. | 713/186 |
| 2007/0006291 A1 * | 1/2007 | Barari et al. | .................... | 726/10 |
| 2008/0059804 A1 * | 3/2008 | Shah et al. | .................... | 713/186 |
| 2009/0199264 A1 * | 8/2009 | Lang | ................................. | 726/1 |
| 2009/0228211 A1 * | 9/2009 | Rasanen et al. | ................... | 702/1 |
| 2010/0071040 A1 * | 3/2010 | Upp et al. | ........................ | 726/6 |
| 2010/0115266 A1 * | 5/2010 | Guo et al. | .................... | 713/156 |
| 2010/0115267 A1 * | 5/2010 | Guo et al. | .................... | 713/156 |
| 2011/0040965 A1 * | 2/2011 | Feezel et al. | ................. | 713/156 |
| 2011/0173697 A1 * | 7/2011 | Kurapati et al. | ................ | 726/22 |

\* cited by examiner

*Primary Examiner* — Christopher Revak
(74) *Attorney, Agent, or Firm* — RatnerPrestia

(57) ABSTRACT

The present invention relates to the field of authentication of users of services over a computer network, more specifically within the paradigms of federated authentication or single sign-on. A known technique consists of associating different trust levels to different authentication mechanisms, wherein the respective trust levels give access to different information resources, notably to provide the possibility to protect more sensitive resources with a stronger form of authentication. The present invention provides a mechanism to allow the trust level to decrease without re-authenticating with the single sign on system, down to the level at which it is no longer sufficient to obtain access to a desired resource. Only then, the user needs to reauthenticate.

31 Claims, 2 Drawing Sheets

METHOD AND SYSTEM FOR PROVIDING A FEDERATED AUTHENTICATION SERVICE WITH GRADUAL EXPIRATION OF CREDENTIALS

TECHNICAL FIELD

The present invention relates to the field of authentication of users of services over a computer network, more specifically within the paradigm of federated authentication.

BACKGROUND ART

Federated authentication is a service architecture designed to improve the manageability and user experience of network application environments which operate under a many-to-many relationship between the set of users and the set of applications. The practical manifestation of a federated authentication platform, is the ability to perform Single Sign On (SSO), i.e., allowing a user log on to a plurality of network applications without requiring her to enter credentials each time she crosses the virtual boundary between different administrative domains.

A central concept in federated authentication is the clustering of various service providers (these may be embodied as individual servers, or as different applications on the same server) into a federation that relies on a common identity provider. Any authentication request from a new user is processed by the common authenticator, which issues a "ticket". This ticket constitutes an assertion of the common authenticator on the user's identity and, in some embodiments, on the user's associated authority to access services within the federation. The ticket can be subsequently presented to different service providers within the same federation. The ticket has a limited lifetime; it may either expire automatically (after expiry of a predefined amount of time), or expire as the result of an explicit action (e.g., the user logging out from the federation, or a ticket revocation initiated by the common authenticator). Such expiration of the ticket is separate from the expiration of a logon session on a particular server, which requires the user to log on again.

Several variations of federated authentication schemes are known in the art. For example, U.S. Pat. No. 6,668,322 [U.S. Pat. No. 6,668,322 B (WOOD, DAVID ET AL] discloses an access management system and method employing secure credentials. The method includes authenticating an end user (client) by means of a login credential, and issuing cryptographically secured session credentials that may be used to obtain access to a plurality of information resources, whereby such verification does not require knowledge of the key with which the session credential was generated. This way of cryptographically securing the session credential allows for an architecture whereby a centralized authentication infrastructure issues the session credentials, but a decentralized cloud of application providers is capable of autonomously verifying these session credentials. Wood et al. also disclose according a finite lifetime to the cryptographically secured session credentials. Wood et al. further disclose issuing different cryptographically secured session credentials associated with different trust levels, which give access to different information resources, notably to provide the possibility to protect more sensitive resources with a stronger form of authentication.

US Patent Publication no. 2002/0184507A1 [US 2002184507 A (MAKOWER, DAVID ET AL.) 2002, Dec. 5] discloses a centralized single sign on method and system for a client-server environment, focusing more specifically on hypertext-transfer protocol (http) interactions, i.e. a "web single sign on" solution. In that architecture, "users authenticate themselves with any one of a group of federated servers, each federated server communicates with the central sign on server so that a user with a current session does not need to be re-authenticated by other servers in the federation". The scheme involves http-redirection from the server application to which access is desired (the "originating server"), to a central sign on server, and back to the originating server. The first redirect instruction includes a challenge generated by the originating server. The central sign on server first looks for an indication of whether the client has already established a session, which might be signalled by the presence of an http "cookie". If no session has been established in advance, the central sign on generates a new "cookie", and redirects the client back to the originating server (including the originating server's challenge with the redirect instructions). The redirected client will then authenticate with the originating server, which keeps a record of the session thus established, and informs the central sign on server of this session in a secure way (using signed and encrypted communication). The session has a finite lifetime. As long as the session is valid, any subsequent requests from the same clients to access other servers in the federation will be redirected from the central sign on server to the respective originating servers, with a signature over the relevant session identification data and the originating server's challenge to confirm that a valid session has already been established with at least one federated server. Upon being informed of the setup of each subsequent session at any federated server, the central sign on server updates the expiry time of the relevant client's session. Conversely, the central sign on server may, upon a request from the client relayed by a federated server, actively terminate an existing session, and propagate this termination towards all federated servers at which local sessions are still active.

In U.S. Pat. No. 7,194,547 [U.S. Pat. No. 7,194,547 B (MOREH, JAHANSHAH ET AL.) 2007, Mar. 20], a federated authentication service is disclosed which allows clients to authenticate through a variety of authentication mechanisms. In that architecture, a protocol proxy is used to translate and relay the client's credentials to an appropriate authentication mechanism, and to generate, upon successful authentication, a "name assertion" which can be used by the client to access a server application. In the method according to Moreh et al., the client initiates the process of obtaining access to the server application by contacting an authentication agent and passing to it the relevant identity and domain of the client. The authentication agent provides information about an authentication mechanism for the client to use. The client then communicates an authentication request for access to the server application to a protocol proxy. The protocol proxy receives the authentication request from the client and translates it into the native protocol of the appropriate authentication mechanism. The protocol proxy attempts to authenticate with the authentication mechanism and, upon successful authentication, the protocol proxy receives back from the authentication mechanism a response including attributes and access rights of the client. The protocol proxy then creates a name assertion and, optionally, entitlements, which it translates into an authentication response transmitted back to the client. The expiration time of the name-assertion can be requested by the client, the server application, or the authentication mechanism. The client delivers the authentication response to the server application.

The basic advantage of a single sign on system is that a user only authenticates once. After a successful authentication to the central single sign on system, the central system will cause the user to automatically log in to other systems. After a configured amount of time since the last user activity in the session, the authentication session on the single sign on system expires and the user has to re-authenticate.

In many single sign on systems, each authentication type has an associated authentication trust level. Applications integrated with these single sign on systems will define a certain required authentication trust level. Users of such an application will need to be authenticated at the defined authentication trust level or better, before being allowed to use that application.

DISCLOSURE OF THE INVENTION

Technical Problem

In the prior-art solutions, once a user has authenticated at a certain authentication trust level, the authentication trust level remains constant during the whole single sign on session. The trust level can only be increased by re-authenticating with the single sign on system using an authentication method that represents a different trust level.

This model does not adequately address the fact that the security value of a successful authentication decreases over time. Single sign on systems as known in the art have an expiry time, which protects the federated systems from being accessed by means of a single sign on session that is no longer under the control of the legitimate user or that has been compromised in the cryptographic sense, risks that increase as time goes by. Single sign on systems supporting different trust levels should have more trust in a recent authentication than in a less recent one.

Technical Solution

The present invention is based on the insight that the security problem described above can be more adequately addressed in multi-level single sign on systems by introducing authentication trust level degradation.

An idea to overcome the problems specified above is to implement in the single sign on system an algorithm that performs an authentication trust level degradation. That way, the single sign on system will only allow an authenticated user access to a certain resource if the current authentication trust level is equal to or higher than the authentication trust level required for the resource.

The instantaneous authentication trust level L(t) will be equal or lower to the initial authentication trust level $L_0$ and will be calculated based on the configured authentication trust level degradation rules. Different algorithms are possible for implementing this authentication trust level degradation.

One such algorithm provides a linear degradation: in this case the authentication trust level decreases proportionally to the time telapsed since the moment of successful authentication:

$$L(t)=\max\{0,L_0(1-ct)\}$$

Another such algorithm provides step-based degradation: in this case the authentication trust level decreases in function of the time elapsed since the successful authentication, in one or more discrete steps.

In some embodiments the pace or amount of trust level degradation might be a function of the degree of user activity. For example, if the user remains inactive for a certain amount of time, the current trust level may be degraded to a certain configured level that is lower than the current trust level.

The person skilled in the art will understand that there are countless other algorithms that could be used to accomplish the same purpose, without departing from the spirit of the invention.

The assessment of the trust level at any given time may happen in various ways. In one possible embodiment, the assessment is done at the authentication server, possibly every time an authentication request is received. Hence, the authentication server will return, in a ticket, the most current trust level associated with an active session. In another possible embodiment, the degradation algorithm is known to the server providing the resource. The same authentication ticket can be used throughout the session, but it becomes less trusted as time goes by, until the trust level decreases below the required minimum trust level for the resource in question, at which time it may no longer be used to gain access to said resource. A hybrid way of implementing this, is letting the authentication server issue a "layered ticket", each layer of which is a ticket with a certain trust level and an associated expiry time, wherein the layers with higher trust levels are set to expire sooner than the layers with lower trust levels. It is also possible to implement a double-check mechanism, in which both the authentication server and the server providing the resource perform an assessment according to a degradation algorithm. In a particular embodiment the server providing the resource may apply its own version of the degradation algorithm.

Advantageous Effects

In the prior-art solutions, once a user has authenticated at a certain authentication trust level, the authentication trust level remains constant during the whole single sign on session. The expiry time of the credential is linked to the trust level provided by the credential; a high trust level is typically linked with a short expiry time, implying that a high-level authentication may require frequent reauthentication.

The present invention provides a mechanism to allow the trust level to decrease without re-authenticating with the single sign on system, down to the level at which it is no longer sufficient to obtain access to a desired resource. At that point in time, the user reauthenticates.

This way users that do a high quality initial authentication can be provided with credentials that have a long life-time for less sensitive resources while at the same time the security of specific sensitive resources can be maintained at a high level since these long lasting credentials would degrade relatively quickly below the high trust level required for these sensitive resources. The invention thus provides an improved balance between securing the access to sensitive resources, and maintaining user convenience, especially for less sensitive resources.

BRIEF DESCRIPTION OF THE DRAWINGS

The foregoing and other features and advantages of the invention will be apparent from the following, more particular description of several embodiments of the invention, as illustrated in the accompanying drawings.

MODE(S) FOR CARRYING OUT THE INVENTION

Figure 1:
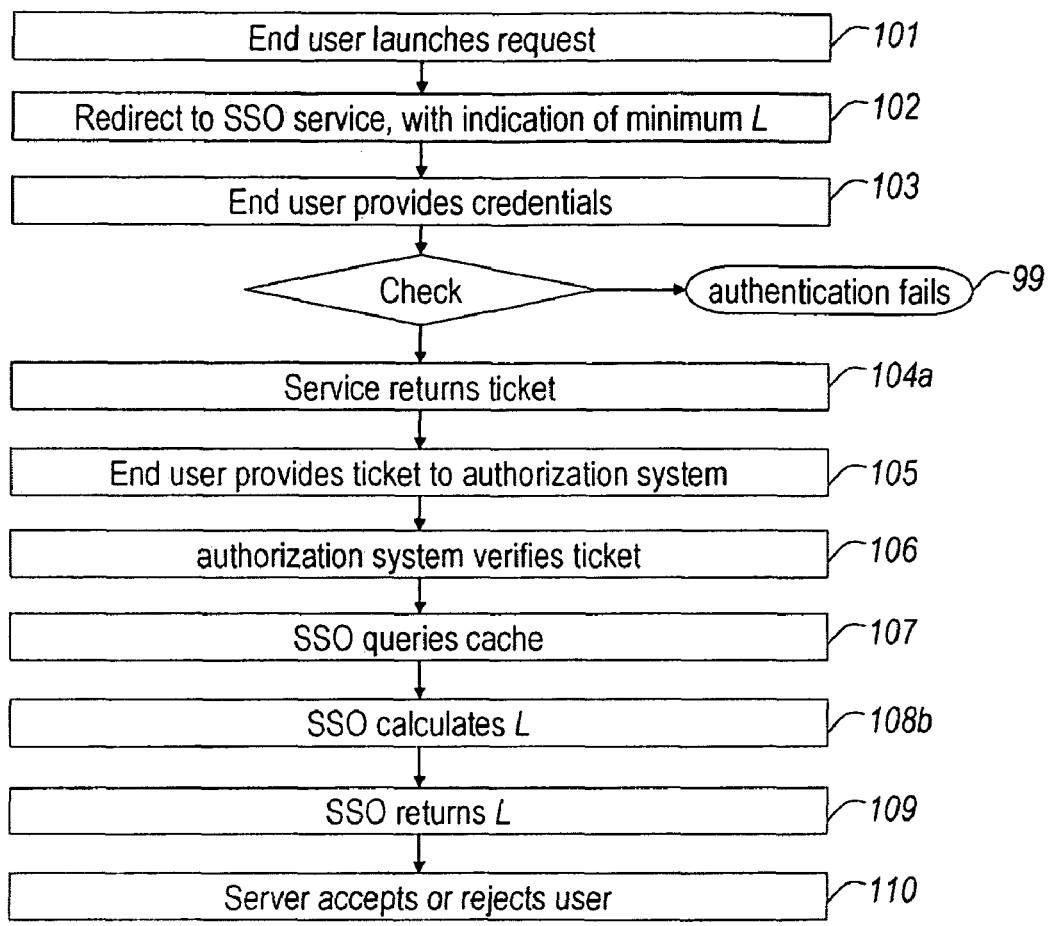
FIG. 1 shows a flow chart of the method according to the invention, illustrating the steps taken by a client, a server, a single sign on service, and said service's authentication cache.
Figure 2:
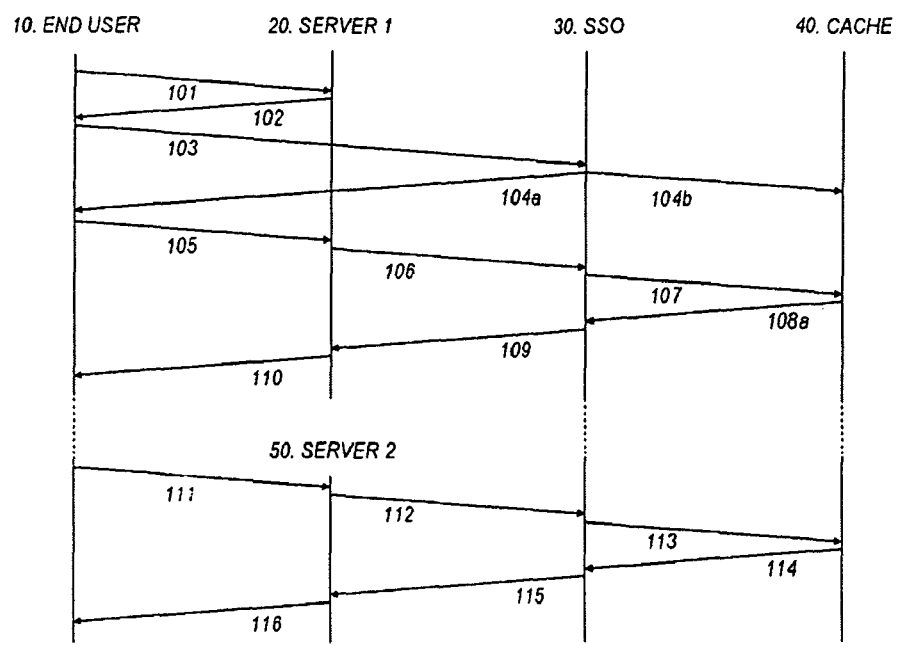
FIG. 2 shows a protocol interaction diagram of the method according to the invention, illustrating the interactions of a client 10, a first server 20, a single sign on service 30, the service's cache 40, and a second server 50. The same labels are used in both FIG. 1 and FIG. 2 to designate the same or conceptually similar acts and features.
Figure 3:
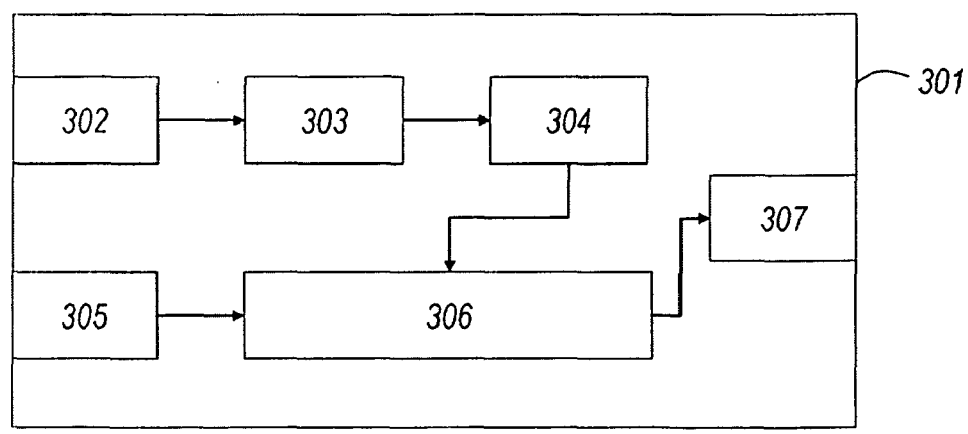
FIG. 3 provides a schematic illustration of a system 301 providing the functions of an authentication server according to the invention.

In a method according to the present invention, an end-user 10 trying to access a protected resource on a server 20, protected by an authorization system, would go through the following steps.

Upon requesting access to the resource 101, the end-user is redirected 102 to an SSO authentication service to logon. Via the redirect message 102 and the client's subsequent request 103, the system 20 provides the authentication service 30 an indication of the minimum authentication trust level for the requested protected resource. In its interaction 103 with the authentication service 30, the end-user 10 provides the necessary authentication credentials. The authentication service 30 verifies the authentication credentials and returns 104a an authentication ticket containing an identification of the authenticated user, the obtained authentication trust level, a unique ticket identifier and optionally the identity or location of the authentication service. The authentication service 30 saves a copy of the authentication ticket in its cache 104b.

In a next step 105, the end user 10 provides this ticket to the server's authorization system 20. The authorization system 20 verifies this ticket with the authentication service 30 requesting the current authentication trust level 106. The authentication service 30 queries its cache 40 to check on the authentication ticket, which involves a request 107 and a response 108a. If a ticket is found, the authentication service 30 calculates 108b the authentication trust level for the specified user 10 using the configured authentication trust level degradation rules and returns it 109 to the authorization service 20. If no ticket is found, the authentication service 30 returns 109 that the authentication trust level is 0. This can be due to ticket expiration.

The authorization service 20 checks if the current authentication trust level is equal to or higher than the requested level and provides the end-user 10 access to the requested resource if the ticket is adequate 110.

A subsequent access attempt to a different resource in the federation will benefit from the authentication performed in the earlier session. Consider the same end-user 10 trying to access another protected resource on a second server 50, protected by an authorization system.

The end user 10 provides his ticket 111 obtained earlier, to the authorization system 50. The authorization system 50 verifies this ticket with the authentication service 30 requesting the current authentication trust level 112. The authentication service 30 searches the authentication ticket in its cache, which involves request 113 and response 114. If a ticket is found, the authentication service 30 calculates the authentication trust level for the specified user 10 using the configured authentication trust level degradation rules and other information, such as the time at which the ticket was generated, and returns it 115 to the authorization service 50. If no ticket is found, the authentication service 30 returns 115 that the authentication trust level is 0. This can be due to ticket expiration.

The authorization service 50 checks if the current authentication trust level is equal to or higher than the requested level and provides the end-user 10 access to the requested resource if the ticket is adequate 116.

In an alternative scheme, a user request 101 that includes a ticket is handled by the server 20, without further interaction with the authentication server 30.

This is possible if the ticket is in a form that can be verified locally; such may be the case if the server 20 shares a cryptographic secret with the authentication server 30, or if the authentication server 30 uses a public key infrastructure to generate the ticket. In this scheme, the user's messages 101 and 105 effectively coincide. The exchange characterized by the messages 106, 107, 108a, and 109 is replaced by local processing at the server 20, which includes assessing the current trust level for the user 10 using the configured authentication trust level degradation rules and other information, such as the time at which the ticket was generated. The server 20 provides the end-user 10 access to the requested resource if the ticket is adequate 110.

A general embodiment of the method for providing a single sign-on service comprises receiving at an authentication server an authentication request from a user; authenticating said user at said authentication server; associating at least one initial trust level with said authentication; receiving a validation request pertaining to said user and an application server, said application server enforcing a required minimum level of trust; calculating an updated trust level to be associated with said authentication from at least a function of time; granting said user access to said application server if said updated trust level exceeds said required minimum level.

In one embodiment of the present invention, the method further comprises generating an authentication ticket for said user. In one particular embodiment of the method of the present invention, said validation request contains a reference to said authentication ticket.

Another general embodiment of the method for providing a single sign-on service comprises receiving at an authentication server an authentication request from a user; authenticating said user at said authentication server; generating an authentication ticket for said user; associating at least one initial trust level with said authentication ticket; receiving a validation request pertaining to said user and an application server, said validation request containing a reference to said authentication ticket, and said application server enforcing a required minimum level of trust; calculating an updated trust level to be associated with said authentication ticket from at least a function of time; granting said user access to said application server if said updated trust level exceeds said required minimum level.

In one embodiment of the method of the present invention, said function of time is a function of the time elapsed since said authenticating.

In another embodiment of the method of the present invention, said calculating also uses said initial trust level.

In yet another embodiment of the method of the present invention, said calculating also uses said required minimum level of trust, and said calculating results in a symbolic value indicating authentication failure if said required minimum level of trust is not granted.

In a further embodiment of the method of the present invention, said receiving of said validation request takes place at said application server. In still a further embodiment of the method of the present invention, said receiving of said validation request takes place at said authentication server.

In one embodiment of the method of the present invention, said calculating comprises decreasing said updated trust level linearly with time. In another embodiment of the method of the present invention, said calculating comprises decreasing said updated trust level exponentially with time. In another embodiment of the method of the present invention, said calculating comprises decreasing said updated trust level as a series of step functions in the time domain.

In one embodiment of the method of the present invention, said calculating comprises verifying an expiry time for a plurality of trust levels initially associated with said ticket.

In one embodiment of the method of the present invention, said calculating takes place at said application server. In another embodiment of the method of the present invention, said calculating takes place at said authentication server.

In another embodiment of the method of the present invention, said required minimum level of trust may vary at different application servers. In general a level of trust applicable at one application server is independent of a level of trust applicable at another application server.

A general embodiment of the system 301 for providing a single sign-on service comprises a first receiving agent 302 for receiving an authentication request from a user; an authentication agent 303 for authenticating said user; an issuing agent 304 for issuing an authentication ticket for said user, wherein at least one initial trust level is associated with said authentication ticket; a second receiving agent 305 for receiving a validation request pertaining to said user from an application server, said request containing a reference to said authentication ticket, and said application server enforcing a required minimum level of trust; a processor 306 for calculating an updated trust level to be associated with said authentication ticket from at least a function of time; and a sending agent 307 for sending a signal indicative of said calculating to said application server.

In one embodiment the elements 302-307 are embodied in a SSO authentication server which can be implemented as a general purpose computer supplied with software or firmware to implement these specific functions. The first receiving agent responds to authentication requests from users by storing the request and passing that information on to the authentication agent. The authentication agent can determine whether the user is, or should be considered authentic based on the information received in the request (and perhaps other information either available to the authentication agent or obtained from the user in response to one or more specific requests generated by the authentication agent). The procedures for authenticating the user are conventional. If the user is considered authentic the authentication agent may make appropriate entries in storage (either local or global) and then pass this information on to the issuing agent. The issuing agent manifests the approval to the user and perhaps provides some tangible indication of that approval to the user. The second receiving agent receives validation requests from application servers. The validation request includes or refers to the authentication previously related to the user. The second receiving agent will pass this information on to the processor which can calculate an updated trust level associated with the authentication. The processor then passes this updated trust level on to the sending agent which passes the information on to the appropriate destination such as the application server which made the validation request.

In one embodiment of the system of the present invention, said function of time is a function of the time elapsed since said authenticating.

In another embodiment of the system of the present invention, said calculating also uses said initial trust level.

In yet another embodiment of the system of the present invention, said calculating also uses said required minimum level of trust, and said calculating results in a symbolic value indicating authentication failure if said required minimum level of trust is not granted.

In one embodiment of the system of the present invention, said calculating comprises decreasing said updated trust level linearly with time. In another embodiment of the system of the present invention, said calculating comprises decreasing said updated trust level exponentially with time. In yet another embodiment of the system of the present invention, said calculating comprises decreasing said updated trust level as a series of step functions in the time domain.

In one embodiment of the system of the present invention, said calculating comprises verifying an expiry time for each of said at least one trust levels.

A general embodiment of the system for providing a single sign-on service comprises a receiving agent for receiving an authentication request from a user; an authentication agent for authenticating said user; and, an issuing agent for issuing an authentication ticket for said user, wherein at least one initial trust level and at least one subsequent trust level are associated with said authentication ticket, said subsequent trust level having a validity period extending beyond the validity period of said initial trust level.

In one embodiment of the present invention, the system further comprises a first server and a second server, each said server including a trust agent, each trust agent establishing a minimum level of trust, which is independent of the trust level of another trust agent.

A general embodiment of the method for providing a single sign-on service comprises receiving an authentication request from a user; authenticating said user; and, issuing an authentication ticket for said user, wherein at least one initial trust level and at least one subsequent trust level are associated with said authentication ticket, said subsequent trust level having a validity period extending beyond the validity period of said initial trust level.

Elements of the method and systems herein described may be implemented in application-specific hardware, field-programmable hardware, general-purpose processors with adequate software, and the like, as will be clear to the person skilled in the art.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. A method for providing a single sign-on service, comprising
receiving at an authentication server an authentication request from a particular user;
performing an authentication of said particular user at said authentication server;
associating a time-dependent trust level with said authentication, said trust level having at least an initial value;
associating with at least one of a plurality of application servers a required minimum level of trust for a user to be granted access to said at least one application server;
receiving a validation request pertaining to said particular user and said application server;
calculating an updated instantaneous value for said time-dependent trust level associated with said authentication by adjusting the instantaneous value of said trust level based on at least a function of time;
granting said user access to said application server if said updated instantaneous value for said time-dependent trust level exceeds said required minimum level of trust associated with said application server.

2. The method of claim 1, further comprising generating an authentication ticket for said particular user.

3. The method of claim 2, wherein said validation request contains a reference to said authentication ticket.

4. The method of claim 1, wherein said function of time is a function of the time elapsed since said authentication.

5. The method of claim 1, wherein said calculating also uses said initial value of said trust level.

6. The method of claim 1, wherein said calculating also uses said required minimum level of trust, and wherein said calculating results in a symbolic value indicating authentication failure if said required minimum level of trust is not granted.

7. The method of claim 1, wherein said receiving of said validation request takes place at said application server.

8. The method of claim 1, wherein said receiving of said validation request takes place at said authentication server.

9. The method of claim 1, wherein said calculating comprises decreasing said instantaneous value for said time-dependent trust level linearly with time.

10. The method of claim 1, wherein said calculating comprises decreasing said instantaneous value for said time-dependent trust level exponentially with time.

11. The method of claim 1, wherein said calculating comprises decreasing said instantaneous value for said time-dependent trust level as a series of step functions in the time domain.

12. The method of claim 1, wherein said calculating takes place at said application server.

13. The method of claim 1, wherein said calculating takes place at said authentication server.

14. The method of claim 1, wherein said required minimum level of trust may vary at different application servers.

15. The method of claim 1, wherein said calculating comprises decreasing said instantaneous value for said time-dependent trust level with time.

16. A system for providing a single sign-on service, comprising:
   a first receiving agent for receiving an authentication request from a user;
   an authentication agent for authenticating said user;
   an issuing agent for issuing an authentication ticket for said user, wherein a time-dependent trust level is associated with said authentication ticket, said trust level having at least an initial value;
   a second receiving agent for receiving a validation request pertaining to said user from an application server, said request containing a reference to said authentication ticket, and said application server enforcing a required minimum level of trust;
   a processor for calculating an updated instantaneous value for said time-dependent trust level associated with said authentication ticket by adjusting the instantaneous value of said trust level based on at least a function of time; and
   a sending agent for sending a signal indicative of said calculating to said application server, said application server granting said user access dependent on said updated instantaneous value for said time-dependent trust level exceeding said required minimum level of trust.

17. The system of claim 16, wherein said function of time is a function of the time elapsed since said authenticating.

18. The system of claim 16, wherein said calculating also uses said initial value of said trust level.

19. The system of claim 16, wherein said calculating also uses said required minimum level of trust, and wherein said calculating results in a symbolic value indicating authentication failure if said required minimum level of trust is not granted.

20. The system of claim 16, wherein said calculating comprises decreasing said instantaneous value for said time-dependent trust level linearly with time.

21. The system of claim 16, wherein said calculating comprises decreasing said instantaneous value for said time-dependent trust level exponentially with time.

22. The system of claim 16, wherein said calculating comprises decreasing said instantaneous value for said time-dependent trust level as a series of step functions in the time domain.

23. The method of claim 16, wherein said calculating comprises decreasing said instantaneous value for said time-dependent trust level with time.

24. A system for providing a single sign-on service, comprising:
   at least one server comprising:
      a receiving agent for receiving an authentication request from a user;
      an authentication agent for authenticating said user; and,
      an issuing agent for issuing an authentication ticket for said user, wherein at least one initial trust level and at least one subsequent trust level are associated with said authentication ticket, said subsequent trust level having a lower value than said initial trust level and said subsequent trust level having a validity period extending beyond the validity period of said initial trust level;
   wherein each of said at least one server includes at least one of the receiving agent, the authentication agent, or the issuing agent.

25. A system as recited in claim 24, wherein the at least one server comprises a first server and a second server and wherein
   each said server including a trust agent, each trust agent establishing a minimum level of trust, wherein said first server trust agent establishes a minimum level of trust which is independent of a minimum level of trust established by said second server trust agent.

26. The system of claim 24 further comprising an access granting agent for granting said user access to an application wherein a minimum required trust level is associated with said application and wherein said granting agent grants said user access to said application if said initial trust level exceeds said minimum required trust level and the validity period of said initial trust level has not yet been exceeded or if said subsequent trust level exceeds said minimum required trust level and the validity period of said subsequent trust level has not yet been exceeded.

27. A method for providing a single sign-on service, comprising
   receiving an authentication request from a user;
   authenticating said user; and,
   issuing layered authentication ticket for said user, wherein a particular trust level and expiry time are associated with each of two or more layers of said authentication ticket and wherein the expiry time of any particular layer of said two or more layers is set to expire sooner than the expiry times of layers with a lower trust level than the trust level associated with said particular layer.

28. The method of claim 27 further comprising granting said user access to a particular application server wherein said granting access depends on whether for at least one layer of said authentication ticket the associated expiry time has not yet expired and the associated trust level exceeds a minimum required trust level associated with said application server.

29. A method for providing a single sign-on service, comprising
- receiving at an authentication server an authentication request from a particular user;
- performing an authentication of said particular user at said authentication server;
- associating a time-dependent trust level with said authentication;
- associating with at least one of a plurality or application servers a required minimum level of trust for a user to be granted access to said at least one application server;
- receiving an access request pertaining to said particular user and said application server;
- calculating an updated instantaneous value for said time-dependent trust level associated with said authentication by adjusting the instantaneous value of said trust level based on at least a function of time;
- granting said user access to said application server if said updated instantaneous value for said time-dependent trust level exceeds said required minimum level of trust associated with said application server.

30. The method of claim 29 wherein said calculating comprises decreasing said instantaneous value for said time-dependent trust level with time.

31. The method of claim 30 wherein the pace of said decreasing with time is a function of user activity.

* * * * *